(12) United States Patent
Donovan et al.

(10) Patent No.: US 11,428,169 B2
(45) Date of Patent: Aug. 30, 2022

(54) ABRADABLE SEALING ELEMENT

(71) Applicants: ROLLS-ROYCE plc, London (GB); Rolls-Royce Corporation, Indianapolis, IN (US)

(72) Inventors: Simon J. Donovan, Nottingham (GB); Peter E. Daum, Fishers, IN (US); Siddharth Ravichandran, Derby (GB)

(73) Assignees: ROLLS-ROYCE PLC, London (GB); ROLLS-ROYCE CORPORATION, Indianapolis, IN (US)

( * ) Notice: Subject to any disclaimer, the term of this patent is extended or adjusted under 35 U.S.C. 154(b) by 0 days.

(21) Appl. No.: 17/096,175

(22) Filed: Nov. 12, 2020

(65) Prior Publication Data

US 2021/0156312 A1 May 27, 2021

(30) Foreign Application Priority Data

Nov. 21, 2019 (GB) ..................... 1916958

(51) Int. Cl.
*F02C 7/28* (2006.01)
*F01D 11/12* (2006.01)
*F16J 15/16* (2006.01)

(52) U.S. Cl.
CPC .............. *F02C 7/28* (2013.01); *F01D 11/122* (2013.01); *F16J 15/16* (2013.01);
(Continued)

(58) Field of Classification Search
CPC ........ F01D 11/08; F01D 11/12; F01D 11/122; F01D 11/125; F01D 11/127; B33Y 80/00; F16J 15/16
See application file for complete search history.

(56) References Cited

U.S. PATENT DOCUMENTS 4,669,955 A * 6/1987 Pellow .................. F01D 11/125
                                                      415/173.4
7,029,232 B2 * 4/2006 Tuffs ..................... F01D 11/127
                                                      415/173.1
(Continued)

FOREIGN PATENT DOCUMENTS

EP        1452696 A2     9/2004
EP        1452696 A3    10/2006
(Continued)

OTHER PUBLICATIONS

Ross, E. Rene 142: A High Strength, Oxidation REsistant DS Turbine. Superalloys 1992. (Year: 1992).*
(Continued)

*Primary Examiner* — Topaz L. Elliott
(74) *Attorney, Agent, or Firm* — Barnes & Thornburg LLP; John Thomas Routon

(57) ABSTRACT

An abradable sealing element comprises a substrate and a sealing structure. The sealing structure comprises one or more wall structures extending from the substrate and defining at least one open cell which is filled with abradable material. The one or more wall structures are formed by additive-layer, powder-fed, laser-weld deposition onto the substrate. The one or more wall structures are formed from nickel-based superalloy and constitute from about 10% to about 50% of the total volume of the sealing structure.

20 Claims, 15 Drawing Sheets

(52) U.S. Cl.
CPC ...... *F05D 2220/32* (2013.01); *F05D 2240/55* (2013.01); *F05D 2300/175* (2013.01)

(56) References Cited

U.S. PATENT DOCUMENTS

| | | | |
|---|---|---|---|
| 2004/0265120 A1* | 12/2004 | Tuffs | F01D 11/127 |
| | | | 415/170.1 |
| 2013/0280049 A1* | 10/2013 | Fisk | F01D 5/20 |
| | | | 415/173.4 |
| 2015/0275687 A1* | 10/2015 | Bruck | B05D 3/0254 |
| | | | 277/345 |
| 2015/0354392 A1* | 12/2015 | Lipkin | F01D 11/125 |
| | | | 415/173.4 |
| 2016/0097295 A1 | 4/2016 | Allen et al. | |
| 2017/0197282 A1* | 7/2017 | Seemann | B23K 26/342 |
| 2017/0239724 A1* | 8/2017 | Diaz | B29C 64/386 |
| 2017/0335708 A1* | 11/2017 | Kray | F01D 11/02 |
| 2018/0050392 A1* | 2/2018 | Mason-Flucke | B22F 10/20 |
| 2018/0355745 A1* | 12/2018 | Mathew | F01D 11/001 |
| 2019/0030783 A1* | 1/2019 | Lu | C04B 35/571 |
| 2019/0120075 A1 | 4/2019 | Strock | |
| 2019/0226352 A1 | 7/2019 | Gier | |
| 2021/0254489 A1* | 8/2021 | Donovan | B22F 10/30 |

FOREIGN PATENT DOCUMENTS

| | | |
|---|---|---|
| EP | 2818645 A1 | 12/2014 |
| EP | 3002417 A1 | 4/2016 |
| EP | 3255254 | 12/2017 |
| EP | 3351739 A1 | 7/2018 |
| GB | 1361814 A | 7/1974 |

OTHER PUBLICATIONS

Burkholder, P. CM 186 LC Alloy Single Crystal Turbine Vanes. ASME Turbio Expo 1998 (Year: 1998).*

Jinoop An et al: "Laser Additive Manufacturing using directed energy deposition of Inconel-718 wall structures with tailored characteristics", Vacuum, https://doi.org/10.1016/j.vacuum.2019.05.027 (Year: 2019).*

Haynes International, Haynes 214 Alloy (Year: 2021).*

Extended EP Search Report completed by the European Patent Office dated Apr. 12, 2021 and issued in connection with EP Application No. 20206441.6.

Great Britain search report dated Apr. 20, 2020, issued in GB Patent application No. 1916958.0.

* cited by examiner

ABRADABLE SEALING ELEMENT

CROSS-REFERENCE TO RELATED APPLICATIONS

This specification is based upon and claims the benefit of priority from UK Patent Application Number 1916958.0 filed on 21 Nov. 2019, the entire contents of which are incorporated herein by reference.

BACKGROUND

Technical Field

The present disclosure concerns abradable sealing elements and methods of manufacturing abradable sealing elements.

Description of the Related Art

Abradable sealing elements are used in, for example, sealing structures of gas turbine engines. For example, abradable sealing elements may be positioned so as to surround aerofoil blades (and, in particular turbine blades), the sealing elements being abradable to enable tips of the aerofoil blades to wear away the sealing elements to optimal sizes and shapes without causing damage to the aerofoil blades.

Such abradable sealing elements may comprise one of more walls arranged to define open cells which may be filled with an abradable material. The one or more walls may be formed by machining (for example, by electro-discharge machining (EDM)) a sealing segment of the engine. Alternatively, the one or more walls may be formed by depositing material (for example by laser-weld deposition methods) onto a surface of a sealing segment of the engine. Wall formation through deposition of material may be used to retrofit abradable sealing elements to engines, for example following excessive wear of existing machined sealing elements.

SUMMARY

According to a first aspect, there is provided an abradable sealing element comprising a substrate and a sealing structure, the sealing structure comprising one or more wall structures extending from the substrate and defining at least one open cell which is filled with abradable material, the one or more wall structures being formed by additive-layer, powder-fed, laser-weld deposition onto the substrate, wherein the one or more wall structures are formed from nickel-based superalloy and constitute from about 10% to about 50% of the total volume of the sealing structure.

The skilled person will appreciate that additive-layer, powder-fed, laser-weld deposition is a method of depositing a material on a substrate comprising supplying powdered material to the substrate (for example, by way of a nozzle) and melting the powdered material, as well as a portion of the substrate, by way of a laser beam to form a weld pool which solidifies to form a weld layer of material on the substrate. Additive-layer, powder-fed, laser-weld deposition is also known as laser weld deposition, laser metal deposition, laser blown powder, directed metal deposition and/or directed energy deposition.

The inventors have found that abradable sealing elements, of the type comprising one or more wall structures extending from the substrate and defining at least one open cell which is filled with abradable material, wherein the one or more wall structures are formed by additive-layer, powder-fed, laser-weld deposition onto the substrate, exhibit improved mechanical, thermophysical and/or tribological properties when the total volume of wall structure formed from nickel-based superalloy constitutes from about 10% to about 50% of the total volume of the sealing structure. Such abradable sealing elements may therefore also have enhanced usable lifespans before maintenance or replacement is required.

The skilled person will appreciate that the volume of the sealing structure is the total geometric volume of the sealing structure, i.e. the total geometric volume of the sealing structure defined by the arrangement of the one or more wall structures defining at least one open cell which is filled with abradable material.

The abradable sealing element may be configured to be positioned radially outward of at least one aerofoil blades, for example in a gas turbine engine. The abradable sealing element may therefore have a radially inner side and a radially outer side. The sealing structure may be provided on the radially inner side and the substrate may be provided on the radially outer side. The sealing structure may therefore have a radially inner surface region, i.e. a region of the sealing structure which faces the at least one aerofoil blade in use. The at least one open cell may be open at the radially inner surface region (i.e. on the radially inner side). The one or more wall structures may be inwardly projecting wall structures which are configured (i.e. arranged) to project inwardly from the substrate towards the at least one aerofoil blade in use.

The skilled person will appreciate that the particular amount (i.e. volume) of nickel-based superalloy may be selected (i.e. within the range of from about 10% to about 50% of the total volume of the sealing structure) so as to achieve the specific mechanical, thermophysical and/or tribological properties required for a particular application.

It may be that the one or more wall structures formed from nickel-based superalloy constitute from about 20% to about 40%, for example, from about 25% to about 35%, of the total volume of the sealing structure. An abradable sealing element in which the one or more wall structures formed from nickel-based superalloy constitute from about 20% to about 40%, or more particularly from about 25% to about 35%, of the total volume of the sealing structure, may be particularly suitable for use in a gas turbine engine.

It may be that the abradable material constitutes from about 50% to about 90%, for example from about 60% to about 80%, or from about 65% to about 75%, of the total volume of the sealing structure.

It may be that the one or more wall structures formed from nickel-based superalloy and the abradable material in the at least one open cell together constitute about 100% of the total volume of the sealing structure.

Accordingly, it may be that the one or more wall structures formed from nickel-based superalloy constitute from about 10% to about 50% of the total volume of the sealing structure and the abradable material constitutes from about 50% to about 90% of the total volume of the sealing structure. It may be that the one or more wall structures formed from nickel-based superalloy constitute from about 20% to about 40% of the total volume of the sealing structure and the abradable material constitutes from about 60% to about 80% of the total volume of the sealing structure. It may be that the one or more wall structures formed from nickel-based superalloy constitute from about 25% to about 35% of the total volume of the sealing structure and the abradable material constitutes from about 65% to about 75% of the total volume of the sealing structure.

It may be that each of the one or more wall structures has a multi-layered microstructure, observed in cross-section in a plane locally perpendicular to a profile of the substrate, comprising a plurality of stacked weld layers. Such a multi-layered microstructure may be a result of the additive-layer, powder-fed, laser-weld deposition process.

It may be that each of the weld layers has a layer thickness, measured in a stacking direction, of no greater than about 350 µm. The inventors have found that a wall structure having a multi-layered microstructure comprising a plurality of stacked weld layers exhibits lower residual stresses and a reduced tendency to crack in use when each of the weld layers has a layer thickness of no greater than about 350 µm.

The multi-layered microstructure comprising the plurality of stacked weld layers may be observable by imaging a cross-section of the wall structure, for example in a Scanning Electron Microscope (SEM) or optical microscope (for example, following standard metallurgical sample processing (e.g. sectioning, grinding, polishing and etching)). Each weld layer may be visible as a region of relatively homogenous contrast in the wall structure. Adjacent weld layers may be separated in the SEM or optical image by weld interfaces visible as (generally linear) regions of differing (e.g. stronger) contrast between weld layers. The location of weld interfaces may also be identified by corresponding indentations on the external surfaces of the wall structures.

It will be appreciated that the layer thickness of a given weld layer is the distance, in the stacking direction, between weld interfaces bounding the said weld layer as measured in the thickest portion of the weld layer. That is to say, the layer thickness of a given weld layer is the maximum thickness (i.e. measured in the stacking direction) of the said weld layer. Accordingly, it may be that each of the weld layers has a maximum thickness, measured in the stacking direction, of no greater than about 350 µm.

The stacking direction may be substantially perpendicular to each of the weld interfaces in the stack.

It may be that the (i.e. maximum) layer thickness of each weld layer of the plurality of stacked weld layers is no less than about 50 µm, for example, no less than about 100 µm. It may be that the (i.e. maximum) layer thickness of each weld layer of the plurality of stacked weld layers is no greater than about 250 µm. Accordingly, the (i.e. maximum) layer thickness of each weld layer of the plurality of stacked weld layers may be from about 50 µm to about 350 µm, for example, from about 100 µm to about 350 µm, or from about 50 µm to about 250 µm, or from about 100 µm to about 250 µm.

It may be that each of the one or more wall structures has a wall width of no less than about 50 µm, for example, no less than about 100 µm, or no less than about 200 µm, or no less than about 300 µm, or no less than about 400 µm. It may be that each of the one or more wall structures has a wall width of no greater than about 1200 µm, for example, no greater than about 1000 µm, or no greater than about 900 µm, or no greater than about 800 µm, or no greater than about 700 µm, or no greater than about 600 µm. It may be that the wall width of the wall structure is from about 50 µm to about 1200 µm, for example, from about 50 µm to about 1000 µm, or from about 50 µm to about 900 µm, or from about 50 µm to about 800 µm, or from about 50 µm to about 700 µm, or from about 50 µm to about 600 µm, or from about 100 µm to about 1200 µm, or from about 100 µm to about 1000 µm, or from about 100 µm to about 900 µm, or from about 100 µm to about 800 µm, or from about 100 µm to about 700 µm, or from about 100 µm to about 600 µm, or from about 200 µm to about 1200 µm, or from about 200 µm to about 1000 µm, or from about 200 µm to about 900 µm, or from about 200 µm to about 800 µm, or from about 200 µm to about 700 µm, or from about 200 µm to about 600 µm, or from about 300 µm to about 1200 µm, or from about 300 µm to about 1000 µm, or from about 300 µm to about 900 µm, or from about 300 µm to about 800 µm, or from about 300 µm to about 700 µm, or from about 300 µm to about 600 µm, or from about 400 µm to about 1200 µm, or from about 400 µm to about 1000 µm, or from about 400 µm to about 900 µm, or from about 400 µm to about 800 µm, or from about 400 µm to about 700 µm, or from about 400 µm to about 600 µm.

The multi-layered microstructure of each of the one or more wall structures may comprise at least three, for example, at least five, or at least ten, or at least twenty, or at least thirty, or at least forty, stacked weld layers.

It may be that at least one of (e.g. some, for example all of) the one or more wall structures has a tapered width profile in a direction extending away (e.g. substantially perpendicular to, e.g. in a radially inward direction in embodiments in which the abradable sealing element is located in a gas turbine engine) from the substrate. A tapered wall structure width profile may be achieved when some or all of the weld layers in the stack have different layer widths. In particular, it may be that the width of the weld layers reduces with increasing distance from the substrate. A tapered width profile has been found to reduce occurrence of horizontal crack formation (i.e. formation of cracks parallel to the substrate profile) during use.

It may be that the tapered width profile of the or each tapered wall structure is a gently tapered width profile. A gently tapered width profile may be achieved when the difference in layer width between adjacent weld layers in a given stack is low. For example, it may be that the (e.g. maximum) difference in layer width between adjacent weld layers in the stack is no greater than about 50 µm, for example, no greater than about 25 µm, or no greater than about 10 µm. A gently tapered width profile has been found to be particularly effective in reducing the occurrence of horizontal crack formation during use.

Additionally or alternatively, it may be that at least one of (e.g. some, for example all of) the one or more wall structures has a substantially uniform width profile in the direction extending away (e.g. substantially perpendicular to, e.g. in a radially inward direction in embodiments in which the abradable sealing element is located in a gas turbine engine) from the substrate. A substantially uniform wall structure width profile may be achieved when each of the weld layers in the stack has substantially the same layer width.

It may be that the (i.e. maximum) thickness of each weld layer in the stack varies with distance from the substrate. For example, it may be that the (i.e. maximum) thickness of one or more weld layers further away from the substrate is less than the (i.e. maximum) thickness of one or more weld layers closer to the substrate. It may be that the (i.e. maximum) thickness of the weld layers decreases with distance from the substrate.

It may be that at least one of (e.g. some of, for example, all of) the one or more wall structures is locally inclined at an oblique angle with respect to a profile of the substrate. The oblique angle may be no greater than about 45°, for example, no greater than about 30° or no greater than about 15°. The oblique angle may be no less than about 5°. The oblique angle may be from about 5° to about 45°, for example, from about 5° to about 30°, or from about 5° to about 15°. Inclined wall structures may provide greater flexibility in designing open cell geometries, enabling the abradable sealing element to be tailored to particular applications. Additionally or alternatively, it may be that at least one of (e.g. some of, for example, all of) the one or more wall structures extends in a direction which is substantially perpendicular to the profile of the substrate.

The nickel-based superalloy may comprise from about 50 wt. % to about 85 wt. % Ni, from about 2 wt. % to about 8 wt. % Al, and the usual impurities. The nickel-based superalloy may further comprise: from about 2 wt. % to about 15 wt. % Co, from about 3 wt. % to about 10 wt. % Cr, from about 1 wt. % to about 7 wt. % W, up to about 5 wt. % Re, about 4 wt. % to about 8 wt. % Ta, up to about 1 wt. % Si, up to about 3 wt. % Hf, up to about 3 wt. % Mo, up to about 1 wt. % Fe, up to about 1 wt. % Ti, up to about 1 wt. % Cu, up to about 0.04 wt. % C, and/or up to about 0.03 wt. B.

It may be that the substrate comprises (e.g. is formed (e.g. entirely) from) superalloy. The superalloy may be a nickel-based superalloy. The nickel-based superalloy may be monocrystalline, i.e. single-crystal. The substrate may be a component for or of a gas turbine engine.

The abradable material may comprise one or more ceramics, metals or intermetallic compounds. For example, the abradable material be selected from: yttria-stabilised zirconia (YSZ), alumina, a nickel-aluminium intermetallic compound such as nickel aluminide ($Ni_3Al$), a nickel-aluminium (Ni—Al) alloy, or combinations thereof. The abradable material may be a sintered material.

In a second aspect, there is provided a method of manufacturing an abradable sealing element according to the first aspect, the method comprising: depositing, by additive-layer, powder-fed, laser-weld deposition apparatus, nickel-based superalloy to form one or more wall structures of a sealing structure on a substrate, the one or more wall structures defining at least one open cell; and filling the at least one open cell with abradable material; wherein the method comprises controlling the amount of nickel-based superalloy deposited onto the substrate such that nickel-based superalloy constitutes from about 10% to about 50% of the total volume of the sealing structure. The method may further comprise: controlling the amount of nickel-based superalloy deposited onto the substrate such that nickel-based superalloy constitutes from about 20% to about 40%, for example from about 25% to about 35%, of the total volume of the sealing structure.

The method may further comprise: controlling the amount of abradable material filling the at least one open cell such that abradable material constitutes from about 50% to about 90%, for example from about 60% to about 80%, or from about 65% to about 75%, of the total volume of the sealing structure.

It may be that depositing nickel-based superalloy to form each wall structure comprises: (e.g. sequentially) depositing, by additive-layer, powder-fed, laser-weld deposition apparatus, a plurality of nickel-based superalloy layers overlying one another on the substrate to form the wall structure.

It may be that each nickel-based superalloy layer has a (i.e. maximum) layer thickness, measured in a direction locally perpendicular to a profile of the substrate, of no greater than about 350 μm, for example, no greater than about 250 μm. It may be that each nickel-based superalloy layer has a (i.e. maximum) layer thickness, measured in the direction locally perpendicular to the profile of the substrate, or no less than about 50 μm, for example, no less than about 100 μm. It may be that each nickel-based superalloy layer has a (i.e. maximum) layer thickness, measured in the direction locally perpendicular to the profile of the substrate, of from about 50 μm to about 350 μm, for example, from about 100 μm to about 350 μm, or from about 50 μm to about 250 μm, or from about 100 μm to about 250 μm.

It will be appreciated that the layer thickness of each of the nickel-based superalloy layers is the layer thickness as measured following deposition of the entire wall structure.

It may be that each nickel-based superalloy layer has a layer width, measured in a direction locally parallel to the profile of the substrate, of no greater than about 1200 μm, for example, from about 50 μm to about 1200 μm.

It may be that depositing nickel-based superalloy to form each wall structure comprises: (e.g. sequentially) depositing, by additive-layer, powder-fed, laser-weld deposition apparatus, at least three, for example, at least five, or at least ten, or at least twenty, or at least thirty, or at least forty, nickel-based superalloy layers overlying one another on the substrate to form the wall structure.

It may be that the method comprises, during additive-layer, powder-fed, laser-weld deposition of the plurality of nickel-based superalloy layers, controlling a powder spot size to be from about 0.1 mm to about 3 mm, for example, from about 0.2 mm to about 0.5 mm. Additionally or alternatively, it may be that the method comprises, during additive-layer, powder-fed, laser-weld deposition of the plurality of nickel-based superalloy layers, controlling a laser spot size to be from about 50 μm to about 1000 μm, for example, from about 200 μm to about 600 μm. Additionally or alternatively, it may be that the method comprises, during additive-layer, powder-fed, laser-weld deposition of the plurality of nickel-based superalloy layers, controlling a laser scanning speed to be from about 400 mm/minute to about 2000 mm/minute, for example, from about 1000 mm/minute to about 1400 mm/minute. Additionally or alternatively, it may be that the method comprises, during additive-layer, powder-fed, laser-weld deposition of the plurality of nickel-based superalloy layers, controlling a powder feed rate to be from about 0.25 g/minute to about 10 g/minute, for example, from about 1 g/minute to about 3 g/minute. The inventors have found that such deposition parameters enable deposition of nickel-based superalloy layers having maximum thicknesses of no greater than about 350 μm, thereby reducing residual stresses and reducing the tendency of the wall structures to crack.

The method may comprise changing the direction of travel of the additive-layer, powder-fed, laser-weld deposition apparatus (i.e. of the nozzle of the additive-layer, powder-fed, laser-weld deposition apparatus) and/or changing the direction of travel of the substrate between deposition of nickel-based superalloy layers. For example, the method may comprise depositing sequential layers in alternating directions of travel. The inventors have found that alternative the direction of travel between layers assists in reducing the tendency of the wall structures to crack.

It may be that the method comprises: varying one or more deposition parameters of the additive-layer, powder-fed, laser-weld deposition apparatus during deposition of the plurality of nickel-based superalloy layers such that two or more nickel-based superalloy layers of the plurality of nickel-based superalloy layers have different layer widths. For example, it may be that the method comprises: varying one or more deposition parameters of the additive-layer, powder-fed, laser-weld deposition apparatus during deposition of the plurality of nickel-based superalloy layers such that each nickel-based superalloy layer deposited has a layer width which is less than or equal to the layer width of any previously deposited nickel-based superalloy layer of the plurality of nickel-based superalloy layers (i.e. and wherein at least one, for example some, of the nickel-based superalloy layers have layer widths less than the layer width of a previously deposited nickel-based superalloy layer), thereby forming a wall structure having a tapered width profile along a direction locally perpendicular to the profile of the substrate. The method may further comprise varying the one or more deposition parameters such that a (e.g. maximum) difference in layer width between sequentially (i.e. consecutively) deposited layers is no greater than about 50 μm, for example, no greater than about 25 μm, or no greater than about 10 μm (thereby forming a wall structure having a gently tapered width profile).

The additive-layer, powder-fed, laser-weld deposition apparatus may comprise a nozzle for supplying powdered nickel-based superalloy and a laser for generating a laser beam to fuse the powdered nickel-based superalloy to form each material layer. It may be that, during deposition by the additive-layer, powder-fed, laser-weld deposition apparatus, the profile of the substrate is inclined at an oblique angle with respect to the laser beam. The oblique angle may be no greater than about 45°, for example, no greater than about 30° or no greater than about 15°. The oblique angle may be no less than about 5°. The oblique angle may be from about 5° to about 45°, for example, from about 5° to about 30°, or from about 5° to about 15°. In embodiments in which the profile of the substrate is inclined at an oblique angle with respect to the laser beam, it may be that the method further comprises: adjusting the relative position of the substrate and the additive-layer, powder-fed, laser-weld deposition apparatus between deposition of each nickel-based superalloy layer of the plurality of nickel-based superalloy layers such that the wall structure formed extends substantially perpendicular to the profile of the substrate.

It may be that filling the at least one open cell with abradable material comprises: filling the at least one open cell with abradable material powder; and sintering the abradable material powder in the at least one open cell.

The nickel-based superalloy may comprise from about 50 wt. % to about 85 wt. % Ni, from about 2 wt. % to about 8 wt. % Al, and the usual impurities.

The nickel-based superalloy may further comprise: from about 2 wt. % to about 15 wt. % Co, from about 3 wt. % to about 10 wt. % Cr, from about 1 wt. % to about 7 wt. % W, up to about 5 wt. % Re, about 4 wt. % to about 8 wt. % Ta, up to about 1 wt. % Si, up to about 3 wt. % Hf, up to about 3 wt. % Mo, up to about 1 wt. % Fe, up to about 1 wt. % Ti, up to about 1 wt. % Cu, up to about 0.04 wt. % C, and/or up to about 0.03 wt. B.

It may be that the substrate comprises (e.g. is formed (e.g. entirely) from) superalloy. The superalloy may be a nickel-based superalloy. The nickel-based superalloy may be monocrystalline, i.e. single-crystal. The substrate may be a component for or of a gas turbine engine.

The method may comprise retrofitting the sealing structure (i.e. the one or more wall structures defining the at least one open cell filled with abradable material) to the substrate (e.g. to the component for or of the gas turbine engine). The method may be a method of replacing or repairing an abradable sealing element (e.g. a sealing structure of an abradable sealing element). For example, the method may comprise removing an existing sealing structure (e.g. a damaged or worn sealing existing structure) from the substrate (e.g. the component for or of the gas turbine engine) prior to depositing, by additive-layer, powder-fed, laser-weld deposition apparatus, nickel-based superalloy to form the one or more wall structures of the sealing structure.

The abradable material may comprise one or more ceramics, metals or intermetallic compounds. For example, the abradable material be selected from: yttria-stabilised zirconia (YSZ), alumina, a nickel-aluminium intermetallic compound such as nickel aluminide ($Ni_3Al$), a nickel-aluminium (Ni—Al) alloy, or combinations thereof. The abradable material may be a sintered material.

In a third aspect, there is provided a gas turbine engine comprising an abradable sealing element according to the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that, except where mutually exclusive, a feature described in relation to any one of the above aspects may be applied mutatis mutandis to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Gas Turbine Engine

Figure 1:
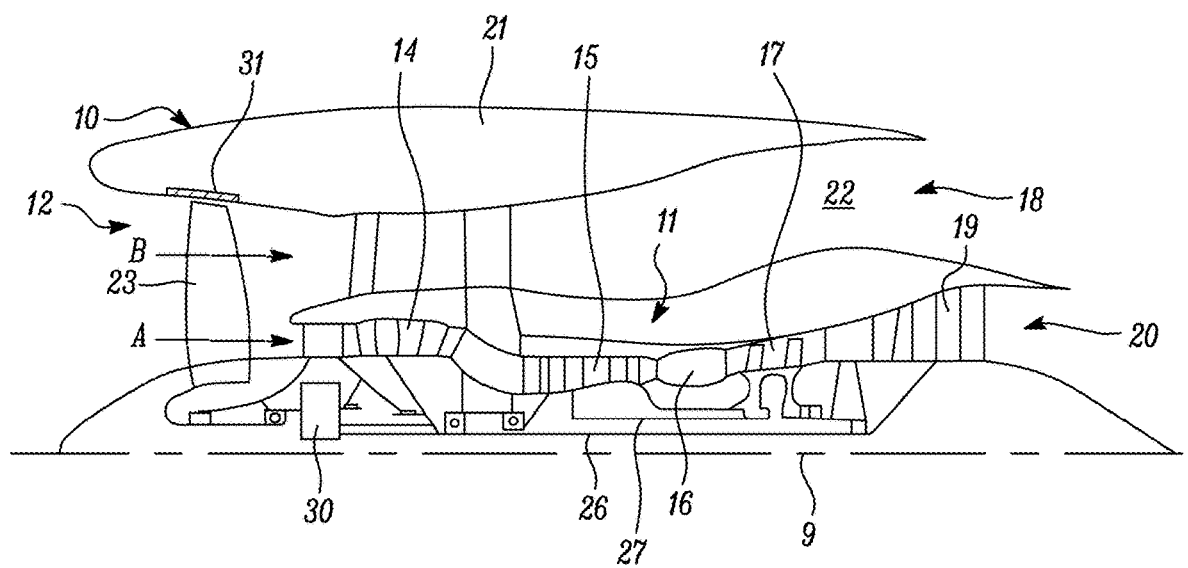
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30. A fan containment arrangement 31 extends around the fan 23 inboard the nacelle 21.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
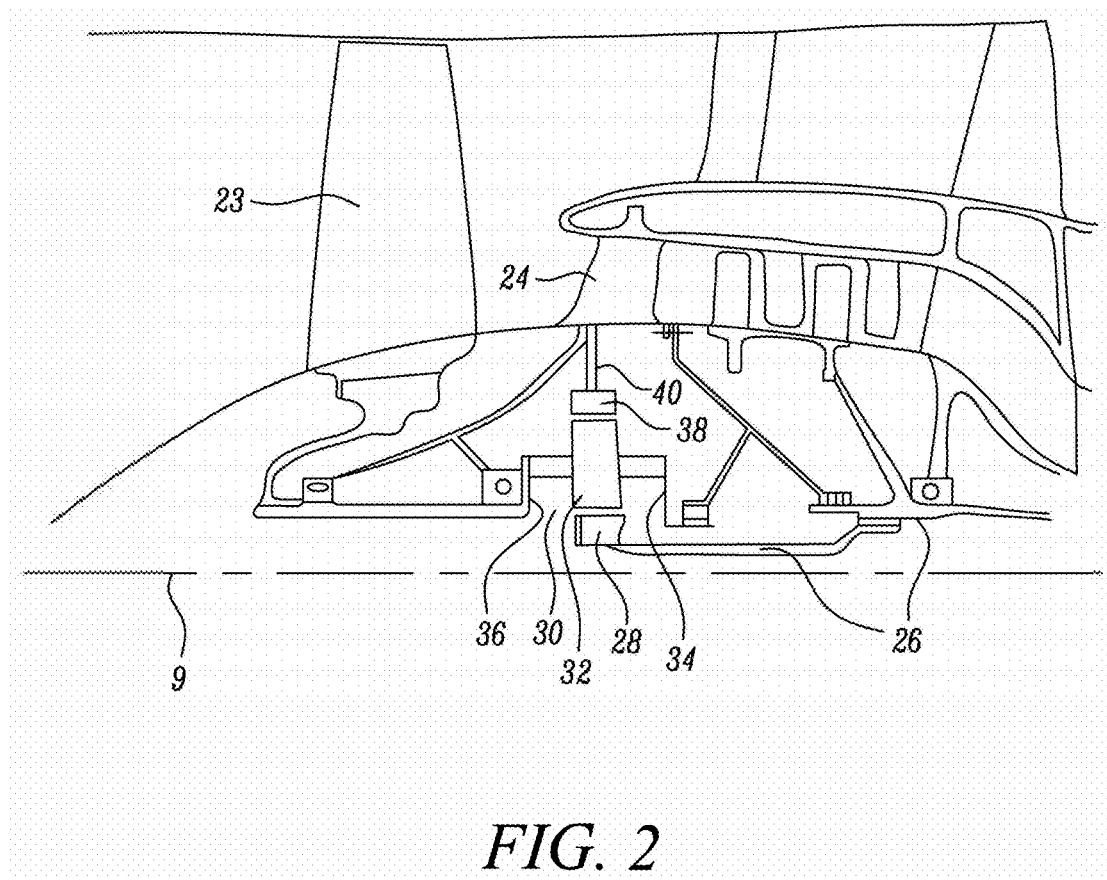
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
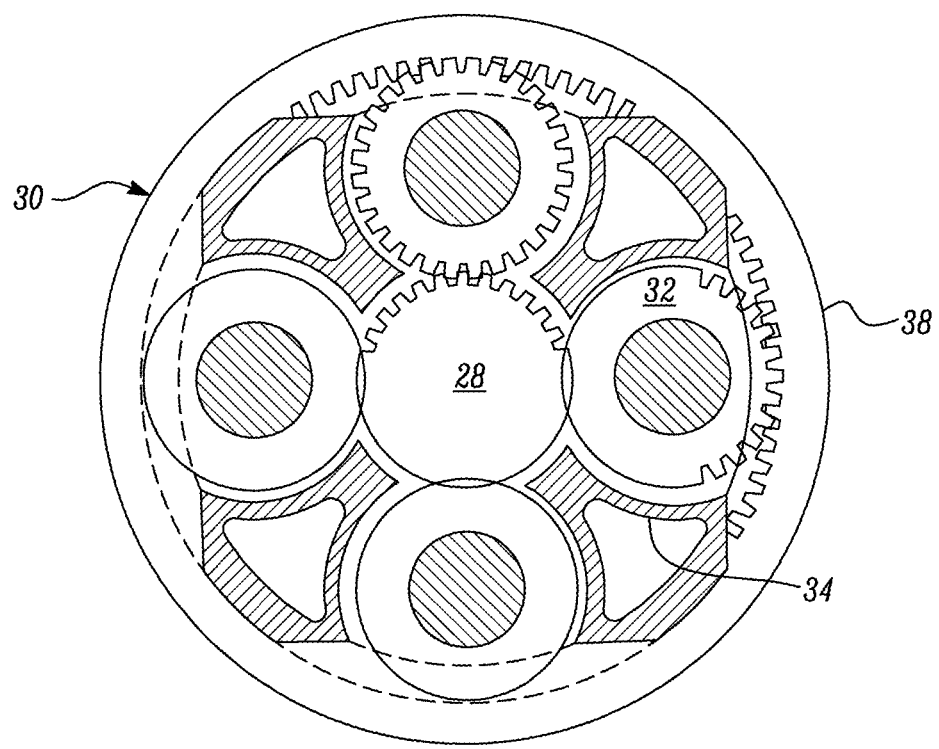
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Abradable Seal Elements

Figure 4:
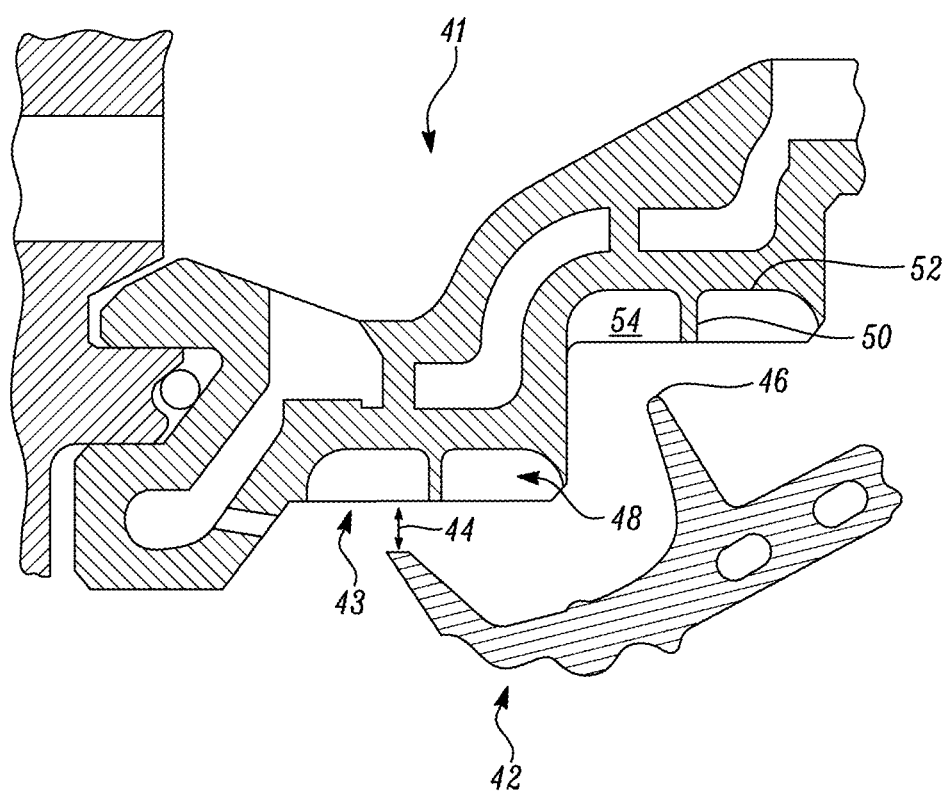
FIG. 4 is a partially cut-away view of a turbine seal segment for a high-pressure turbine of a gas turbine engine.

FIG. 4 illustrates a turbine seal segment 41 for the high-pressure turbine 17. A plurality of arc-shaped sealing elements in the form of a turbine seal segment together form a substantially cylindrical seal segment ring which encases the rotating high pressure turbine blades 42. A small gap 44 is provided between the tips 46 of the turbine blades 42 and a radially inner surface 43 of the seal segment 41. The size of the gap 44 varies with time for various reasons, including variations in the temperatures of the turbine blades 42 and other components.

An open cell structure 48 is formed integrally with the turbine seal segment 41 in the region of its radially inner surface 43. The open cell structure 48 includes upstanding walls 50 which project radially inwards. The walls 50 define therebetween a plurality of open cells 54, the open cells 54 having generally circumferential bases 52. The open cells 54 are able to receive and support an abradable material.

Figure 5:
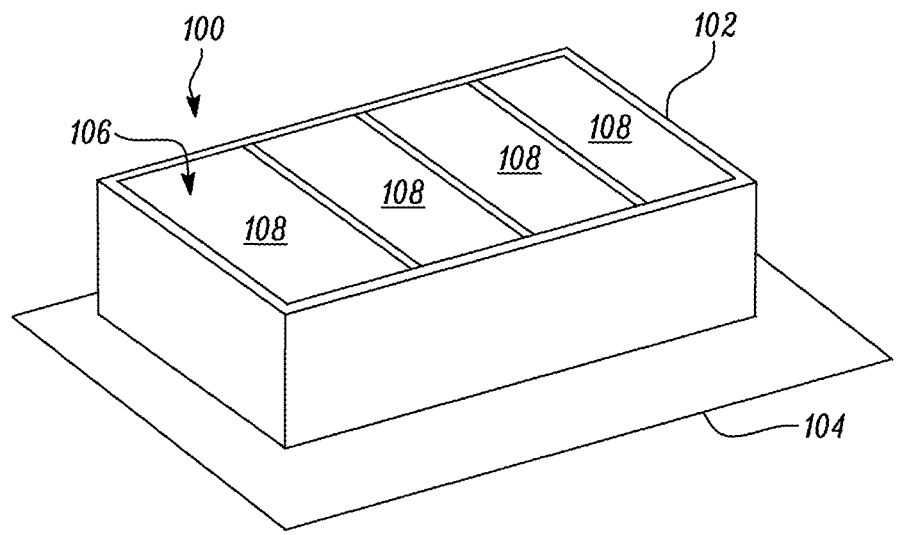
FIG. 5 is a perspective view of an example abradable seal element.
Figure 6:
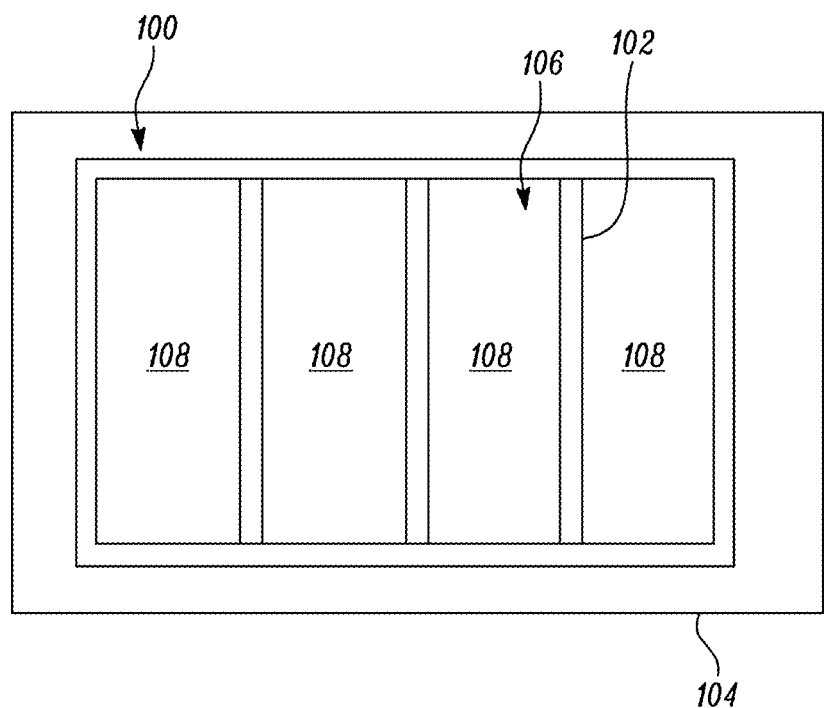
FIG. 6 is a plan view of the example abradable seal element of FIG. 5.
Figure 7:
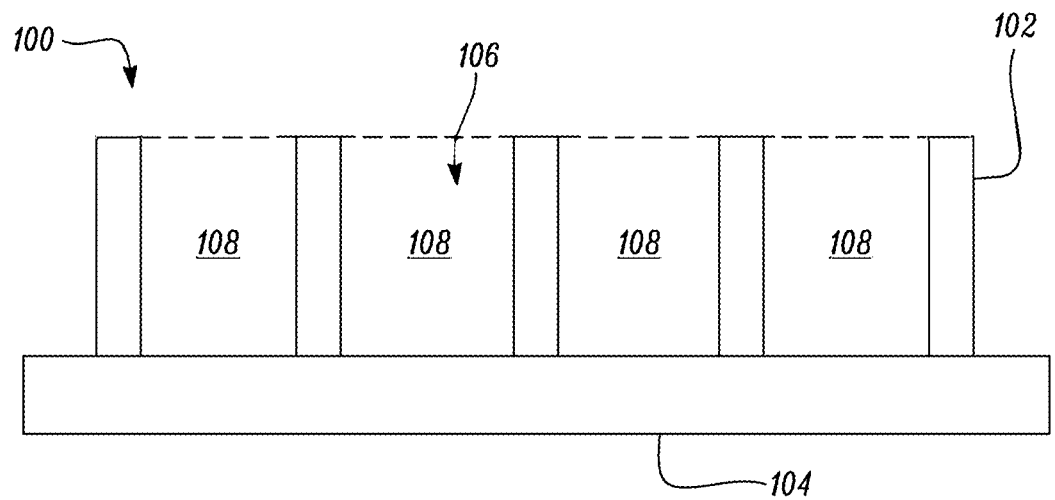
FIG. 7 is a cross-sectional view of the example abradable seal element of FIGS. 5 and 6.

FIGS. 5 to 7 illustrate an example abradable seal element 100 in more detail. The abradable seal element 100 includes a plurality of upstanding walls 102 which extend from a supporting substrate 104 (e.g. a supporting portion of the turbine seal segment 41 in FIG. 4). The walls 102 define therebetween a plurality of open cells 106. In this example, the open cells 106 defined by the walls 102 are generally cuboid. The walls 102 are made of a superalloy such as a nickel-based superalloy. The substrate 104 is also made of a superalloy such as nickel-based superalloy and may be monocrystalline. The open cells 106 are filled with an abradable material 108, such as a sintered powder material. It will be appreciated that the cells 106 are open cells in the sense that each cell has an open end (i.e. a radially inward open end which faces a turbine blade tip 46 in use) not covered by superalloy wall, where the abradable material filling is exposed to the surrounding atmosphere (as illustrated by the use of dashed lines in FIG. 7).

Figure 8:
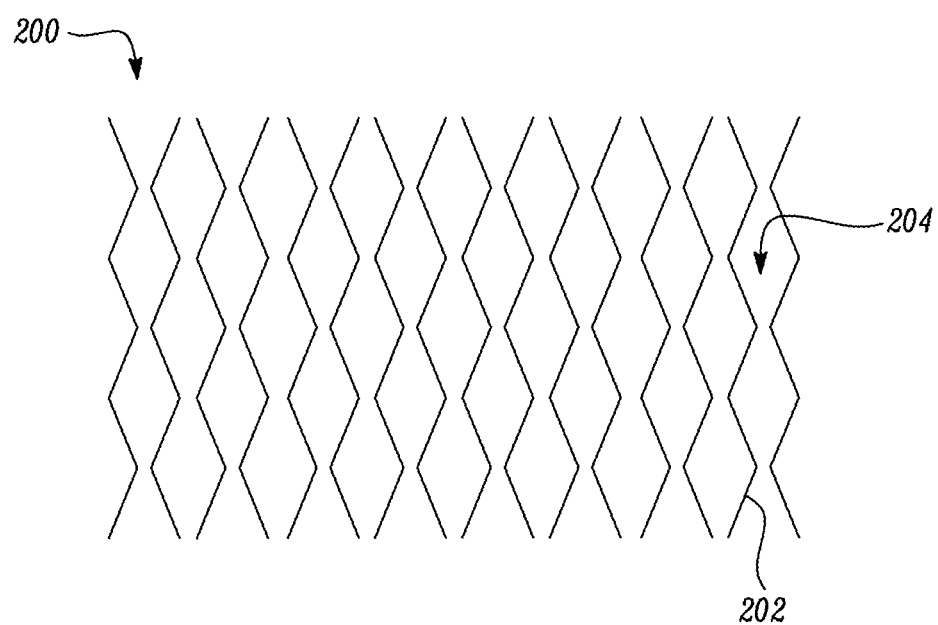
FIG. 8 is a plan view of an example abradable seal element wall structure.
Figures 9, 10:
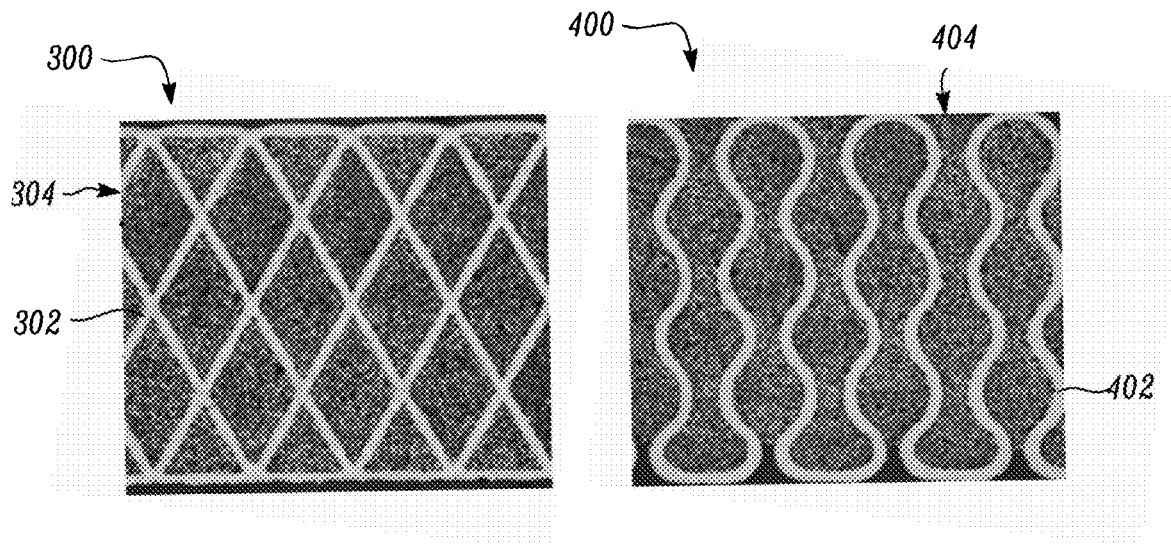
FIG. 9 is a plan view of an example abradable seal element.
FIG. 10 is a plan view of an example abradable seal element.
Figure 11:
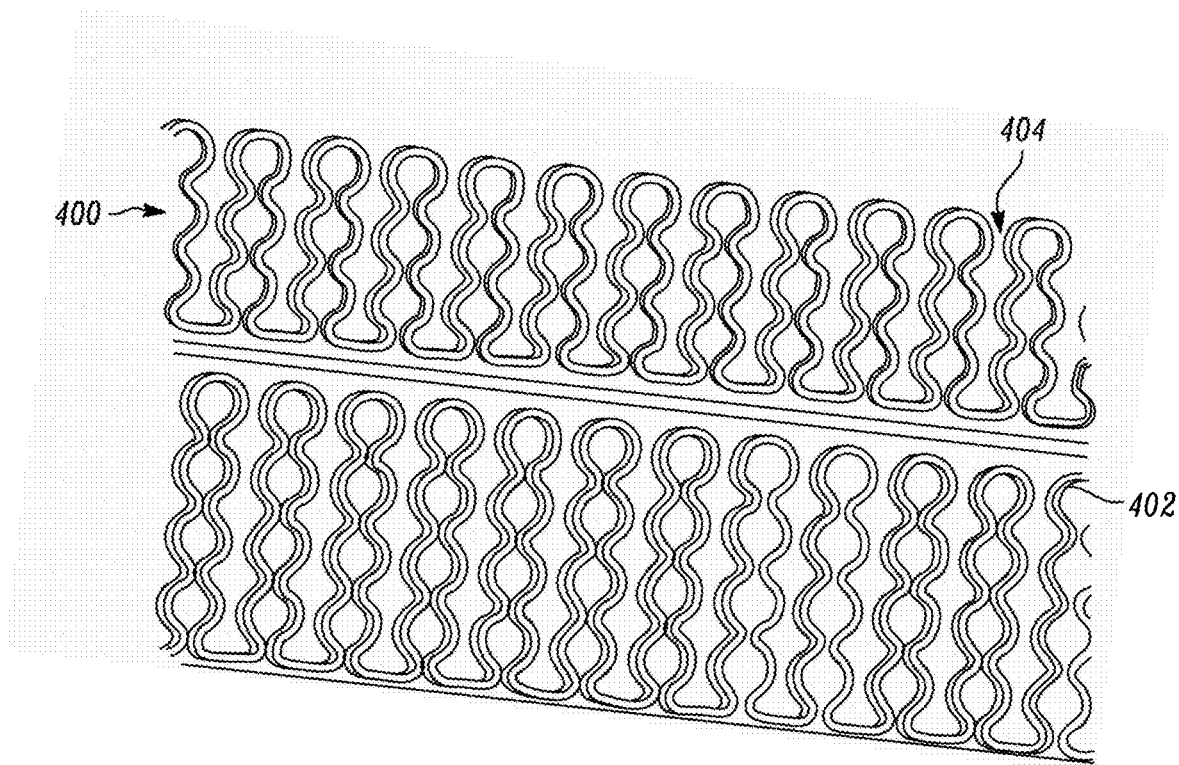
FIG. 11 is an illustration of the example abradable seal element of FIG. 10.

The skilled person will appreciate that many different wall arrangements, and therefore many different open cell shapes, are possible. For example, FIG. 8 illustrates an abradable seal element 200 in which a plurality of upstanding walls 202 are arranged in a zig-zag or saw-tooth pattern to define generally rhomboid-shaped, connected open cells 204. FIG. 9 illustrates an abradable seal element 300 in which a plurality of upstanding walls 302 are arranged in a diamond lattice pattern to define generally rhomboid-shaped, isolated open cells 304. FIG. 10 illustrates an abradable seal element 400 in which a single, continuous curvilinear upstanding wall 402 is arranged to define a plurality of open cells 404. FIG. 11 illustrates the repeating pattern of FIG. 10 in more detail.

Wall arrangements having few or no wall intersections or joins (for example, as seen in FIGS. 10 and 11) have been found to exhibit lower residual stresses and a reduced tendency towards cracking as compared to wall arrangements in which walls intersect or join with one another at many locations (for example, as seen in FIG. 9). Wall arrangements including a few or a single continuous curvilinear upstanding wall may therefore be beneficial.

Wall arrangements lacking enclosing lateral sidewalls (for example, where abradable material forms one or more lateral sides of the abradable sealing element, for example as seen in FIG. 10 or 11) have also been found to exhibit a reduced tendency to crack in use than wall arrangements including one or more lateral sidewalls which enclose the abradable material. Wall arrangements lacking enclosing lateral sidewalls may therefore be beneficial.

The skilled person will further appreciate that different wall and cell dimensions are possible. For example, each upstanding wall may have a wall height (i.e. measured in a direction locally perpendicular to the substrate) of up to about 10 mm and a wall width (i.e. measured in a direction locally parallel to the substrate) of from about 50 μm to about 1.2 mm. Adjacent walls may, on average, be spaced apart from one another by about 1 mm to about 2.5 mm. Each wall may extend away from the substrate in a direction which is substantially locally perpendicular to the substrate. Alternatively, one or more of the walls may be angled with respect to the substrate. For example, one or more of the walls may extend away from the substrate in a direction which is locally inclined at an oblique angle with respect to the substrate. The skilled person will appreciate that the relative geometry of the walls and the substrate is defined locally because the substrate may not be flat; for example, the substrate may have a curved surface.

As discussed hereinabove, the upstanding walls are formed from superalloy. The skilled person will appreciate that any suitable superalloy known in the art may be used. However, the superalloy selected is commonly a nickel-based superalloy. Suitable nickel-based superalloys include CM186, Rene 142, Haynes 214, Amdry 955, IN792 and Haynes 282, among others. The nickel-based superalloy will commonly include at least Ni and Al. One particularly suitable nickel-based superalloy has the composition defined in Table 1.

TABLE 1

| Element | Amount (weight %) |
| --- | --- |
| Ni | from 50 to 80 |
| Co | from 2 to 15 |
| Cr | from 3 to 10 |
| W | from 1 to 7 |
| Re | from 0 to 5 |
| Al | from 2 to 8 |
| Ta | from 4 to 8 |
| Si | from 0 to 1 |
| Hf | from 0 to 3 |
| Mo | from 0 to 3 |
| Fe | from 0 to 1 |
| Ti | from 0 to 1 |
| Cu | from 0 to 1 |
| C | from 0 to 0.04 |
| B | from 0 to 0.03 |

The substrate is also made of a superalloy. The skilled person will appreciate that any suitable superalloy known in the art may be used. However, the superalloy selected is commonly a nickel-based superalloy. Suitable nickel-based superalloys include CMSX-3, MarM247, CMSX-4, MM002, C1023, IN713LC and CM186, among others. The substrate may be a monocrystalline (i.e. single-crystal) nickel-based superalloy.

The skilled person will also appreciate that any suitable abradable material known in the art may be used to fill the open cells. The abradable material may be a ceramic, a metal or an intermetallic compound. For example, the abradable material may be selected from: yttria-stabilised zirconia (YSZ), alumina, nickel aluminide ($Ni_3Al$), or any combination thereof. The abradable material may be particulate material. The abradable material may be a sintered material such as a sintered powder. The abradable material may be a ceramic, metal or an intermetallic compound following sintering. For example, the abradable material may be or comprise nickel aluminide, formed by sintering nickel-aluminium powder. The abradable material may be porous or may be formed from porous or hollow powder (such as porous YZS, porous alumina or hollow NiAl powder (e.g. Metco 2101ZB, Metco 2110 or Metco 2501 available from OC Oerlikon)).

Manufacturing Method

Abradable sealing elements such as those illustrated in FIGS. 5 to 11 may be manufactured by (a) forming upstanding walls on a substrate, the upstanding walls defining open cells, and (b) filling the open cells with abradable material.

The upstanding walls may be formed on the substrate by additive-layer, powder-fed, laser-weld deposition (also known as laser weld deposition, laser metal deposition, laser blown powder, directed metal deposition or directed energy deposition).

Figure 13:
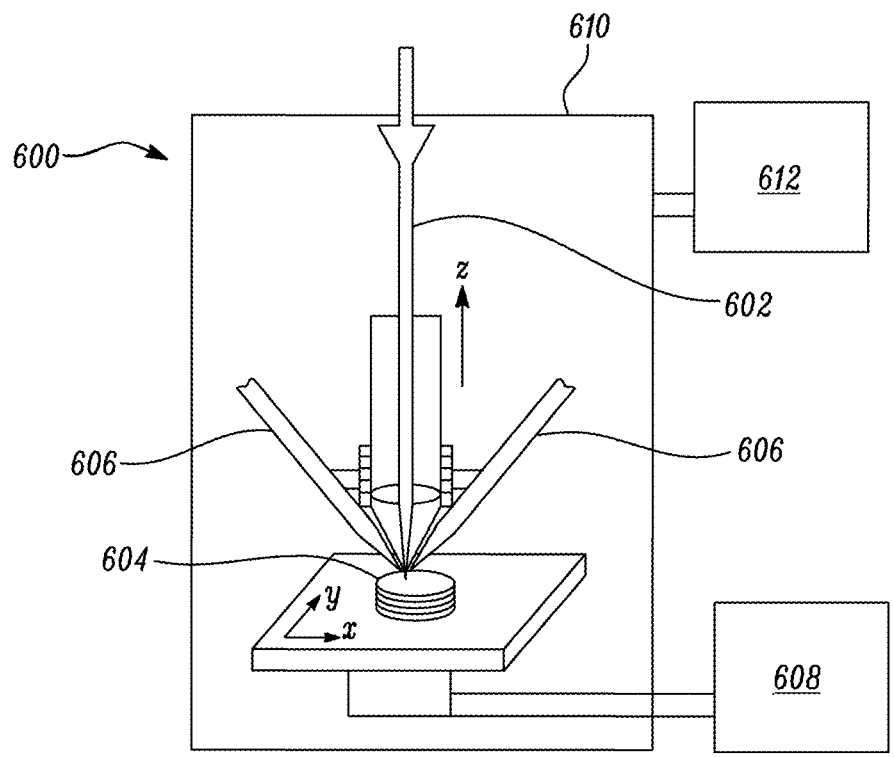
FIG. 13 is a schematic illustration of additive-layer, powder-fed, laser-weld deposition apparatus.
Figure 14:
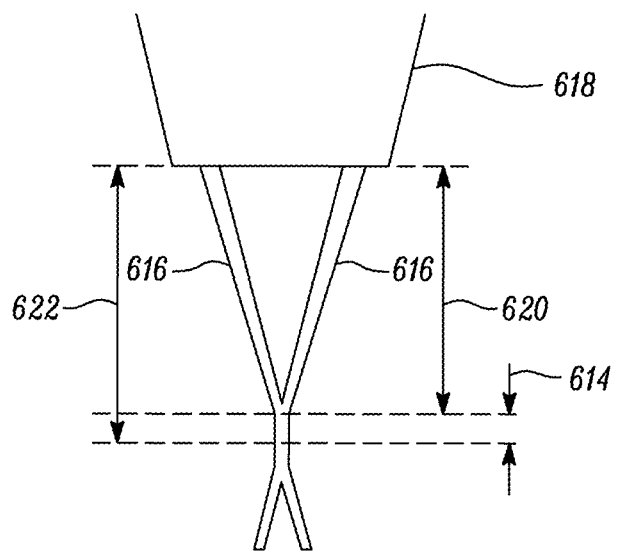
FIG. 14 is a schematic illustration of a nozzle region of the apparatus of FIG. 13.

FIG. 13 illustrates schematically powder-fed, laser-weld deposition apparatus 600. The apparatus 600 focuses a laser beam 602 onto a working region of a substrate 604. The apparatus 600 also supplies powdered material via powder feed tubes 606 to the working region of the substrate 604. The laser beam 602 and the powder feed tubes 606 are held static while the position and movement of the substrate 604 is controlled by a computer control system 608. As illustrated in FIG. 14, it is preferable to position the working region of the substrate 604 in a focal region 614 of the powder supply defined by the powdered material flow paths 616 determined by the nozzle 618 design, the target stand-off distance 620 and the powder focal distance 622. The focused laser beam 602 melts the powder supplied by the powder feed tubes 606, as well as a portion of the working region of the substrate 604, which mix and solidify when the laser beam 602 moves to a new position. A layer of fused material (i.e. a weld layer of material) is therefore formed on the substrate as it is passed through the laser beam 602 and flow of powdered material. The substrate may be passed by the laser multiple times in order to sequentially build up multiple overlying layers of fused material, thereby forming an upstanding wall extending from the substrate 604. The laser welding equipment and the working region of the substrate 604 may be enclosed in a sealed compartment 610 in which the atmosphere is controlled by a gas purifier 612 in order to avoid contamination of the deposited material. Alternatively, deposition may be carried out in an ambient atmosphere with the powder flow and melt pool shielded by the nozzle and the flow of carrier gas (such as argon).

Prior to deposition of the upstanding walls, the laser beam 602 may be scanned across the surface of the substrate 604, along paths where the walls are to be deposited, in order to remove contaminants, such as oxide films, from the substrate.

Following deposition of the upstanding walls using the laser-weld apparatus, the walls may be shaped using any suitable machining method, such as electrical discharge machining (EDM). In particular, machining may be used to reduce the height of the walls, render the height of the walls more uniform across the substrate, or otherwise adjust the profile of the walls. The surfaces of the walls and the open cells defined therebetween may be coated, for example by nickel plating.

The open cells may then be filled with the abradable material in powder form. The abradable material may then be sintered inside the open cells. A layer of less dense sinter material (i.e. a friable layer of sinter material) may then be removed by, e.g., manual dress, EDM or machining.

Optimisation of Wall Deposition

Figure 15:
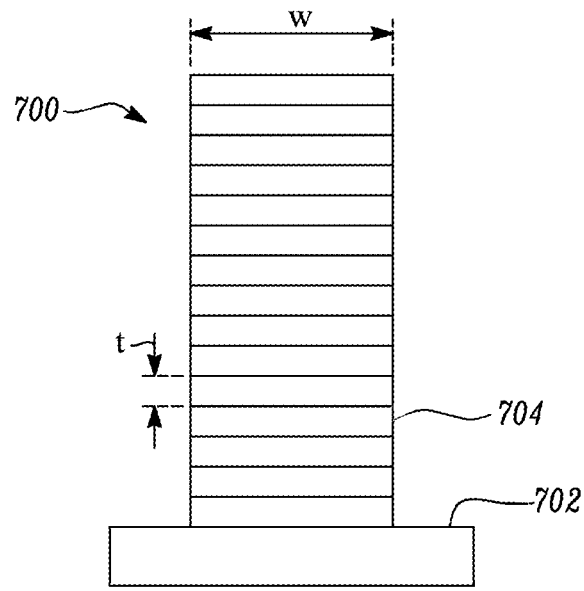
FIG. 15 is a schematic cross-sectional view of a multi-layered wall structure deposited on a substrate.

FIG. 15 illustrates, in cross-section, a wall 700 formed on a substrate 702 by the additive-layer, powder-fed, laser-weld deposition process described hereinabove. In particular, the wall 700 is formed by a plurality of overlying layers of fused material (hereinafter referred to as 'weld layers') 704. Each weld layer 704 is formed by a single pass of the substrate through the laser beam and powder supply during deposition.

Following testing of the effects of varying different deposition parameters during the laser-weld deposition process, the inventors have found that the mechanical properties of the walls formed depend sensitively on the thickness of each of the weld layers. For example, thicker weld layers tend to result in increased microcracking during manufacture, with microcracks subsequently propagating through the structure when the abradable sealing element is used, particularly at high temperatures.

In particular, the inventors have found that it is preferable for each weld layer to have a thickness t (measured in a direction locally perpendicular to the surface of the substrate on which the wall is deposited) which is no greater than about 350 µm. When the thickness t of the weld layers exceeds about 350 µm, the inventors have found that the walls have a tendency to crack (i.e. undergo brittle failure) in use. In contrast, when the thickness t of the weld layers is less than about 350 µm, the mechanical properties (and particularly the high-temperature mechanical properties) of the walls are greatly improved.

Without wishing to be bound by theory, the inventors posit that reducing the weld layer thickness reduces residual stresses that are built up during deposition of the wall structure, resulting in reduced microcracking during manufacture and an increased resistance to temperature-induced cracking when the walls are exposed to the high temperatures found in the hot sections of gas turbine engines. The inventors have also found that a minimum weld layer thickness t of about 50 µm further improves the mechanical properties of the walls formed therefrom.

Figure 19:
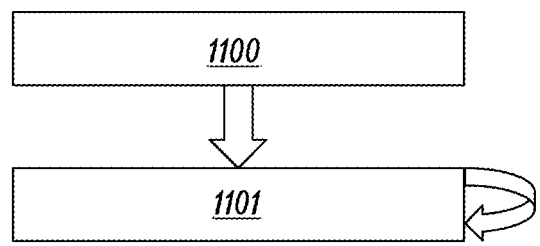
FIG. 19 is a flowchart illustrating a method of forming a wall structure on a substrate.

FIG. 19 illustrates the deposition method in a flow diagram. The method comprises: depositing a first layer of material onto the substrate (block 1100), wherein the layer of material has a thickness in a direction generally perpendicular to the substrate of from about 50 µm to about 350 µm; and depositing a second layer of material onto the first layer of material (block 1101), wherein the layer of material also has a thickness in a direction generally perpendicular to the substrate of from about 50 µm to about 350 µm. The method may comprise repeating block 1101, wherein each layer of material is deposited onto the layer of material deposited in the previous step, until a wall of predefined height is achieved.

Figure 16:
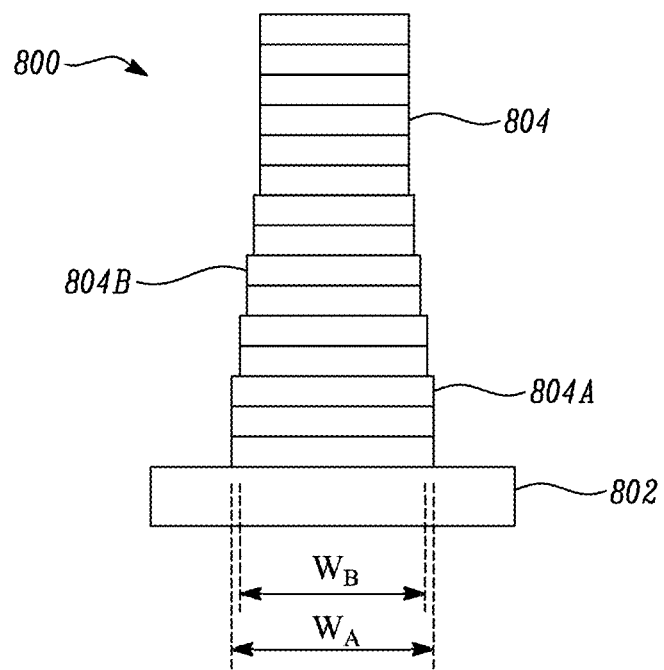
FIG. 16 is a schematic cross-sectional view of a multi-layered wall structure having a tapered width profile.

It should be noted that the width w of each weld layer forming the wall structure need not be the same. For example, FIG. 16 illustrates, in cross-section, a wall 800 formed on a substrate 802 from a plurality of overlying weld layers 804 having varying weld layer widths w. For example, weld layer 804A has a width $w_A$, while weld layer 804B has a width $w_B$, wherein $w_A > w_B$. By depositing weld layers having different widths, it is possible vary the overall width of the wall with distance from the substrate. That is to say, it is possible to form walls having tapered width profiles. In addition, because the weld layer thicknesses are 350 µm or lower, it is possible to form gently tapered width profiles in which the width of the wall structure gently decreases with distance from the substrate. Wall structures having such gently tapered width profiles (i.e. in which there are only small changes in layer width between adjacent weld layers) are less prone to cracking in use than wall structures having tapered width profiles achieved through large step-changes in layer width (as occurs when thicker weld layers are used).

The inventors have found that a weld-layer thickness from about 50 µm to about 350 µm, thereby achieving the desired microstructure and reduction in residual stresses, can be obtained using the following laser-weld deposition parameters (where preferred values are indicated in parentheses):

Laser power: 20 to 500 Watts;
Laser scanning speed: 400 to 2000 mm/minute (e.g. about 1200 mm/minute);
Laser spot size: 50 to 1000 µm (e.g. about 200 to about 600 µm);
Powder feed rate: 0.25 to 10 g/minute (e.g. about 1.4 to about 3 g/minute);
Powder spot size: 0.1 to 3 mm (e.g. about 0.2 to about 0.5 mm);
Travel direction: alternating between layers.

Such laser-weld deposition parameters also result in a lower heat input and consequently a further reduction in residual stresses and microcracking.

The above parameters were determined using a $CO_2$ laser, for example of the type TR1750/380 (Wegmann-Baasel Laser GmbH), but any other suitable type of laser (such as a solid state or fibre laser) may be used. The laser may be operated in a pulse mode, for example having a pulse frequency of about 1 kHz. The powder may be supplied to the substrate using a carrier gas, such as argon, for example supplied at a gas flow rate of about 1 to 5 l/minute, with a nozzle gas flow rate of about 5 to 12 l/minute.

Figure 17:
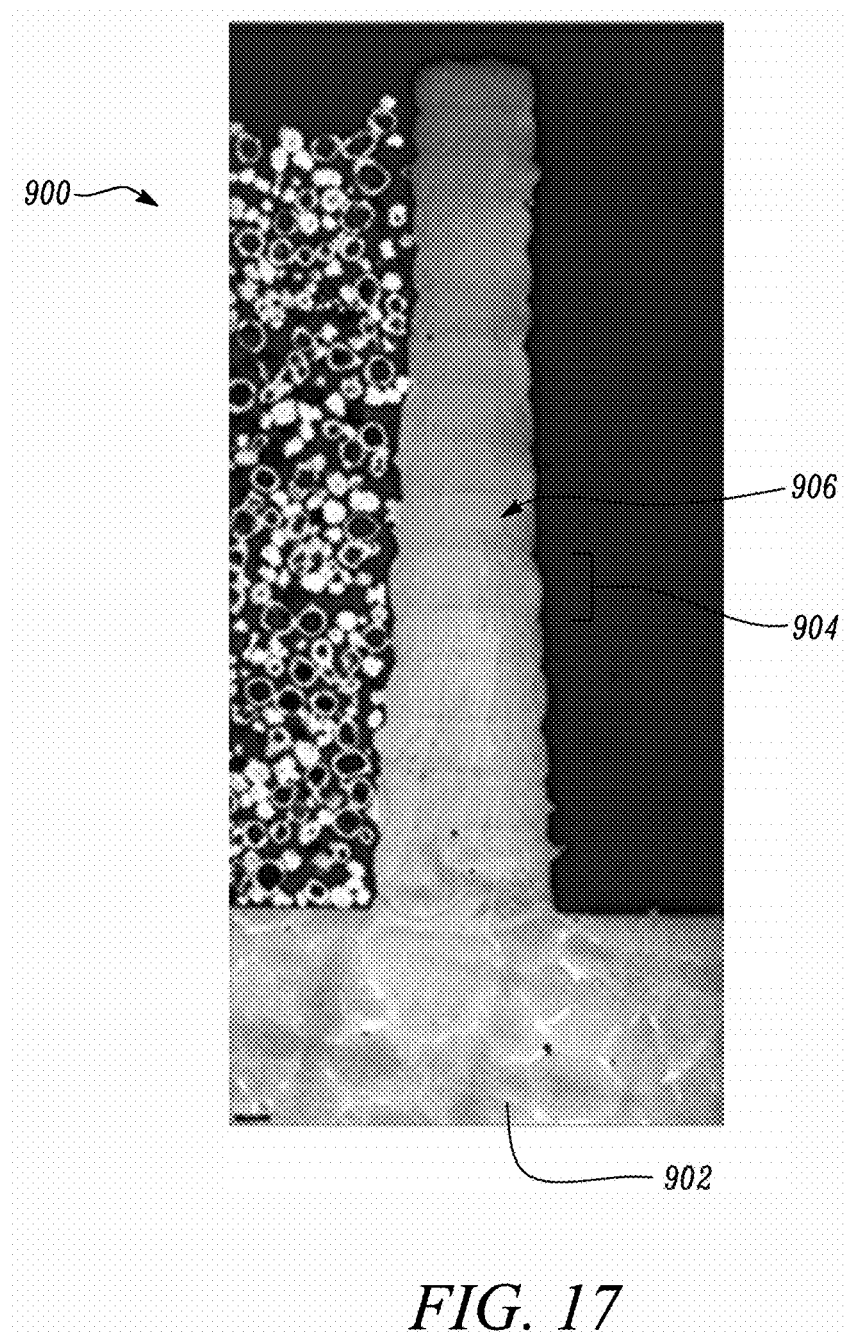
FIG. 17 is an optical micrograph of an etched cross-section through a multi-layered wall structure of an abradable seal element in which multiple, stacked weld layers and weld interfaces are visible.

FIG. 17 is an optical micrograph of a nickel-based superalloy wall 900 deposited on a substrate 902 by the laser-weld deposition method described hereinabove. The wall 900 has a visibly tapered width profile along a direction locally perpendicular to the substrate 902. The individual weld layers 904 are also visible in the image, as are weld interfaces 906 between each of the weld layers 904.

Although the above discussion relates to the deposition of nickel-based superalloy walls (i.e. using nickel-based superalloy powder in the laser-weld deposition process), the skilled person will appreciate that the methods described herein may be used to deposit walls of any type of material depositable by laser-weld deposition. In particular, the method may be used to deposit walls having a maximum wall thickness of about 1200 μm. The mechanical properties of such walls may be improved by controlling the weld layer thickness to be no greater than about 350 μm, and preferably from about 50 μm to about 350 μm.

Figure 18:
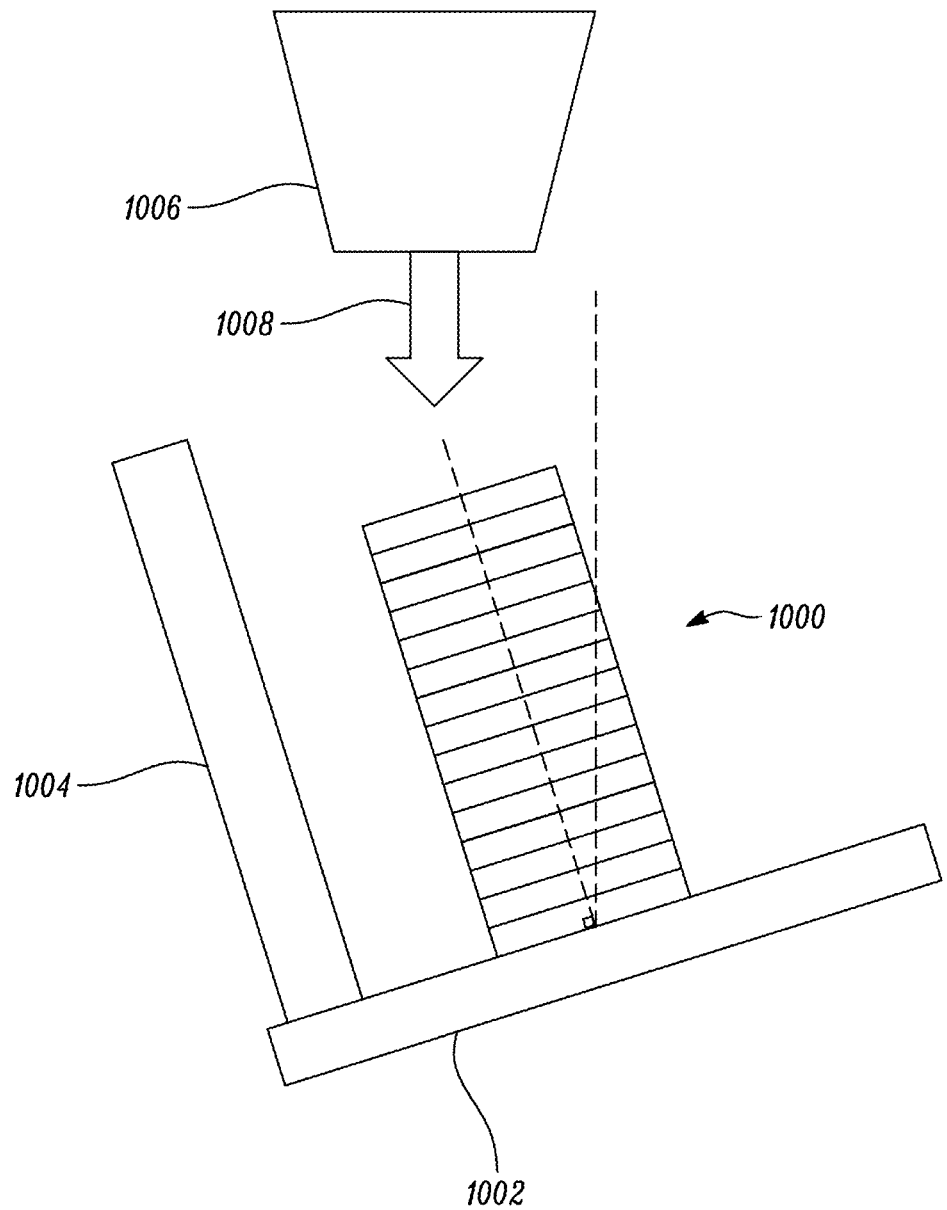
FIG. 18 is a schematic illustration of deposition geometry for depositing a wall structure on a substrate in a constrained space.

The inventors have also developed a method for depositing walls (such as the upstanding walls of abradable sealing elements) on substrates using laser-weld deposition in circumstances where pre-existing neighbouring features on the substrate might otherwise be considered to hinder or prevent laser-weld deposition. For example, FIG. 18 illustrates deposition of a wall 1000 on a substrate 1002 by laser-weld deposition. A neighbouring structure 1004 is present on the substrate 1002. In conventional laser-weld deposition, the laser-weld apparatus 1006 and substrate 1002 are positioned such that the laser beam 1008 is substantially perpendicular to the surface of the substrate 1002 during the deposition process. In such a case, the minimum possible distance between the deposited layers forming the wall 1000 and the neighbouring structure 1004 is limited by the presence of the structure 1004, for example because the presence of the structure 1004 interferes with the nozzle of the apparatus 1006 reaching the correct location on the substrate 1002. However, the inventors have found that a wall 1000 may be deposited closer to the pre-existing structure 1004 by tilting the substrate 1002 such that the substrate is inclined at an oblique angle to the laser beam direction 1008 (as illustrated in FIG. 18). In addition, the inventors have found that, despite the inclined substrate 1002, it is still possible to deposit a wall 1000 which extends generally perpendicularly from the substrate 1002 by sequentially shifting the position of the substrate 1002 relative to the nozzle 1006 between deposition of each material layer. This method not only enables walls to be deposited in constrained spaces, but it also more generally enables walls to be deposited onto tilted or curved substrates.

The deposition methods discussed hereinabove may be used to form abradable seal elements on clean (i.e. new) substrates. Alternatively, these deposition methods may be used to form abradable seal elements on repurposed substrates. For example, these deposition methods may be used to retrofit abradable seal elements to existing gas turbine engine components, for example by depositing new abradable seal elements to the existing gas turbine engine components following removal of previous abradable seal elements (which may have been damaged in use).

Optimisation of Seal Design

As discussed hereinabove, abradable seal elements, such as those illustrated in FIGS. 5 to 11, are designed to be abraded by the rotating turbine blade tips 46 so as to obtain a good seal between the turbine seal segment 41 and the turbine blades 42. However, in order to maintain the seal around the turbine blades 42, it is important that the strength of the remaining, unabraded material is high and that an excessive amount of material is not abraded by the passage of the blades tips. It is also important that the abradable seal elements remain mechanically stable under the conditions (particularly, the temperature) found in gas turbine engines. In particular, it is important that brittle failure (i.e. cracking) of the upstanding walls is avoided, otherwise the abradable seal element may fail in use and require early maintenance or replacement.

Following testing of multiple abradable seal designs, the inventors have found that the high-temperature performance of the seal depends at least in part on the relative amounts of superalloy and abradable material present. In particular, the inventors have found improved behaviour when nickel-based superalloy constitutes from about 10% to about 50% of the total volume of the cellular region of the abradable seal element. The inventors have also found even further improved behaviour when nickel-based superalloy constitutes from about 25% to about 35% of the total volume of the cellular region of the abradable seal element. In particular, optimisation of the relative amounts of superalloy and abradable material enables the required tribological, thermophysical and mechanical properties for an abradable seal to be achieved while ensuring that the deposited structures do not undergo cracking during use at high temperatures.

Figure 12:
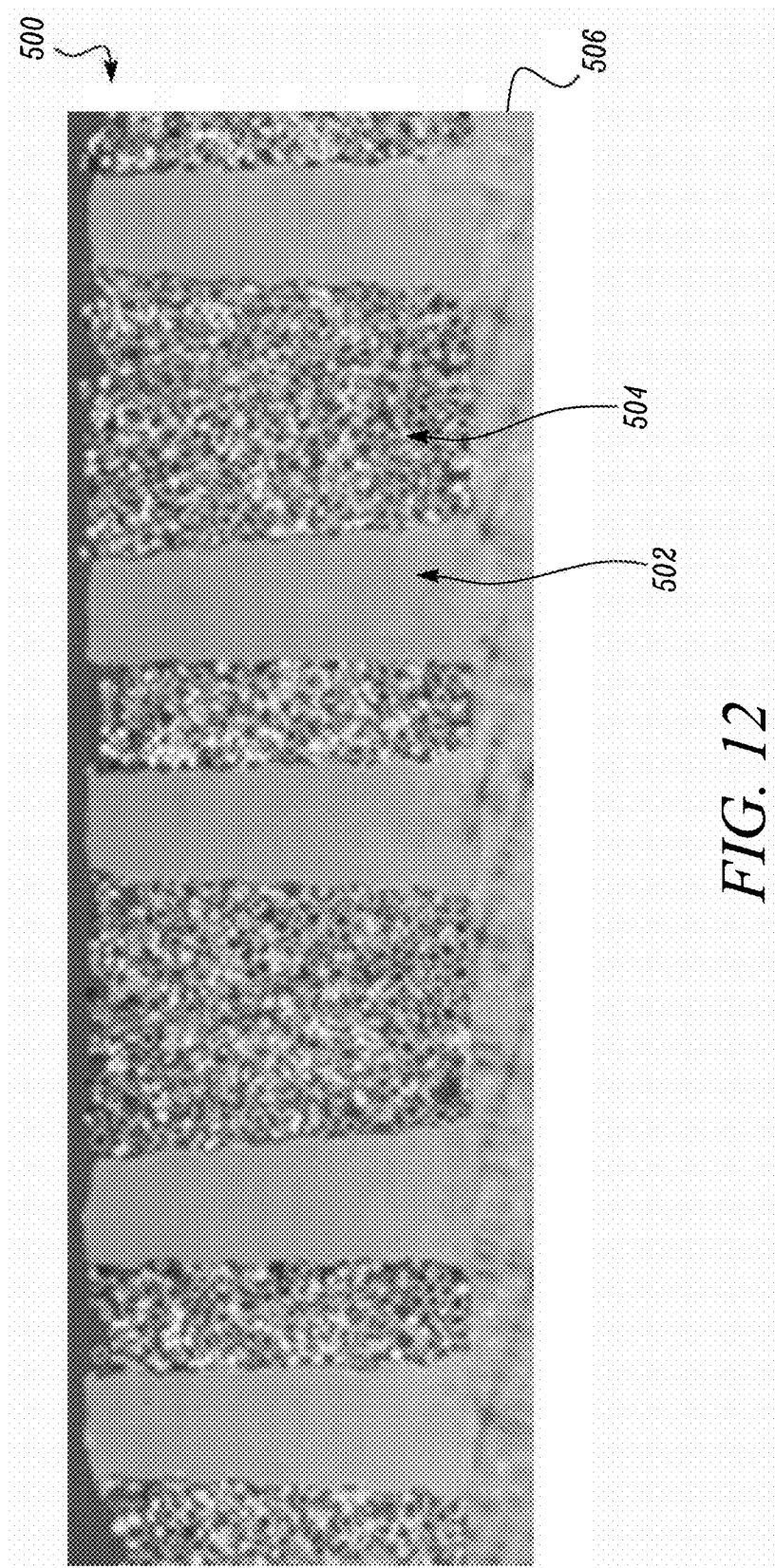
FIG. 12 is an optical micrograph of an etched cross-section through an abradable seal element.

The skilled person will appreciate that the cellular region of the abradable seal element is the region of the abradable seal element formed by the superalloy upstanding walls and the abradable material filling the open cells defined therebetween. The total volume of the cellular region is the total geometric volume of the cellular region, i.e. as defined by the outer surfaces of bounding upstanding walls and an outer surface of the abradable material filling each open cell. For example, FIG. 12 shows a micrograph of a cross-section through a portion of an abradable seal 500 in which superalloy upstanding walls 502, abradable material 504 and substrate 506 are indicated. The volume of upstanding wall in the cellular region may be estimated by measuring and comparing the area of upstanding wall and the total area of the cellular region visible in the image. The total area of the cellular region is the geometric area of the image filled by upstanding wall 502 and abradable material 504. Spaces between individual particles of abradable material 504 are included when the area of the abradable material 504 is determined, that is to say that the measured area of abradable material 504 is equivalent to the geometric area of the portion of each open cell filled with abradable material. In examples in which a cell is entirely filled with abradable material (ignoring the presence of any spaces between individual particles of abradable material), the volume of abradable material in the cell is taken to be the total geometric volume of the cell (i.e. the volume defined by the interior surfaces of the walls bounding the cell and a flat plane drawn across the open end of the cell which contact the bounding walls on each side of the cell). The area of the substrate 506 is not taken into account in the calculation.

Since the total area of the cellular region is formed by areas of superalloy wall and areas of abradable material, when the volume of superalloy is from about 10% to about 50% of the total volume of the cellular region, the volume of abradable material is generally about 50% to about 90% of the total volume of the cellular region. Similarly, when the volume of superalloy is from about 25% to about 35% of the total volume of the cellular region, the volume of abradable material is generally about 65% to about 75% of the total volume of the cellular region. That is to say, the volume of superalloy wall and the volume of abradable material generally adds up to the total volume of the cellular region.

EXAMPLES

Example 1

An abradable seal element was manufactured by (a) using additive-layer, powder-fed, laser-weld deposition to form a plurality of nickel-based superalloy wall structures defining open cells on a surface of a substrate and (b) sintering an abradable material within the open cells. The additive-layer, powder-fed, laser-weld deposition parameters were set such that the wall structures included thick weld layers having layer thicknesses greater than 350 µm and the dimensions of each wall structure were selected such that nickel-based superalloy constituted from about 10% to about 50% of the total volume of the abradable seal element following filling of the open cells with abradable material.

Figure 20:
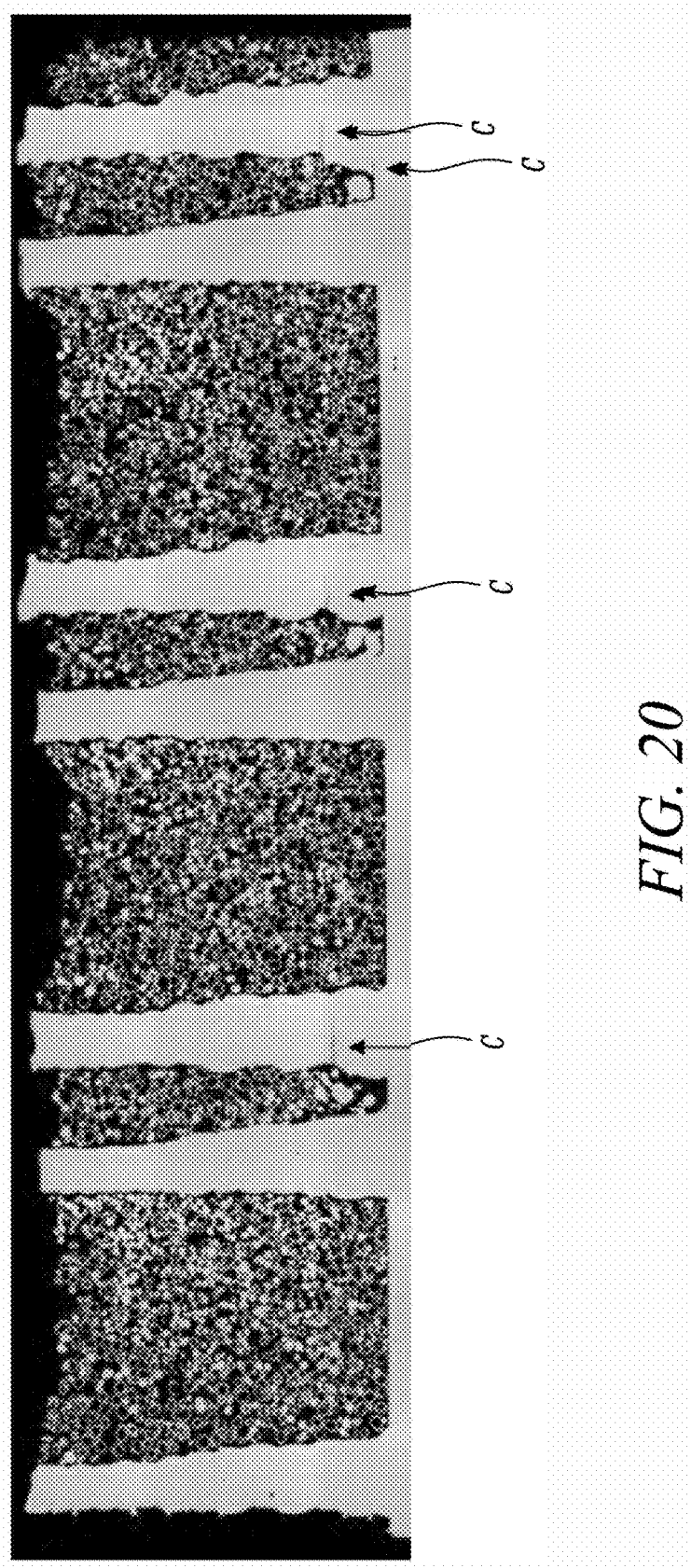
FIG. 20 is an optical micrograph of a cross-section through a first example abradable seal element.

A section through the abradable seal element, in a plane perpendicular to the surface of the substrate, was ground and polished according to standard metallurgical sampling procedures and imaged in an optical microscope. FIG. 20 shows an optical micrograph of the section. At locations in the micrograph labelled C, horizontal cracking was observed.

Example 2

An abradable seal element was manufactured by (a) using additive-layer, powder-fed, laser-weld deposition to form a plurality of nickel-based superalloy wall structures defining open cells on a surface of a substrate and (b) sintering an abradable material within the open cells. The additive-layer, powder-fed, laser-weld deposition parameters were set such that each wall structure was formed from weld layers having layer thicknesses no greater than 350 µm and the dimensions of each wall structure were selected such that nickel-based superalloy constituted from about 10% to about 50% of the total volume of the abradable seal element following filling of the open cells with abradable material.

Figure 21:
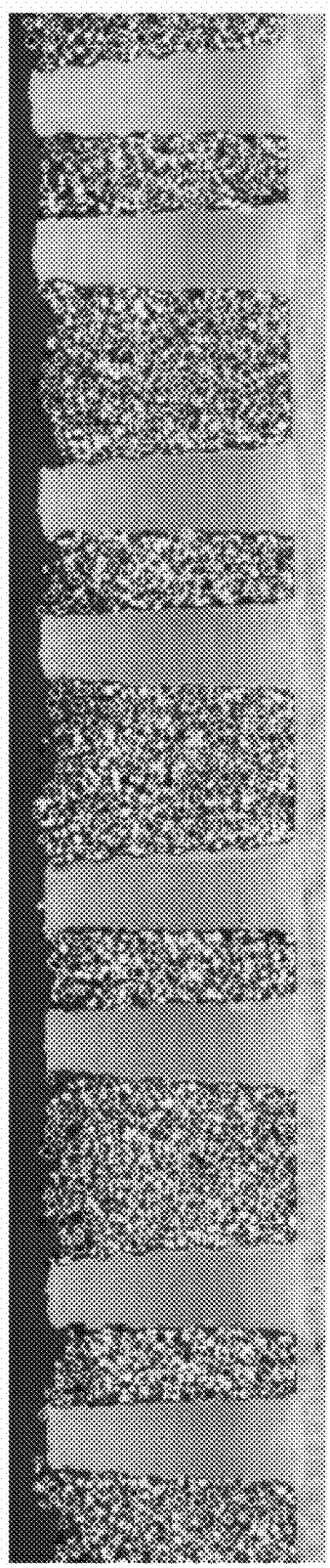
FIG. 21 is an optical micrograph of an etched cross-section through a second example abradable seal element.

A section through the abradable seal element, in a plane perpendicular to the surface of the substrate, was ground, polished and etched according to standard metallurgical sampling procedures and imaged in an optical microscope. FIG. 21 shows an optical micrograph of the section. No horizontal cracking was observed.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An abradable sealing element comprising a substrate and a sealing structure, the sealing structure comprising one or more wall structures extending from the substrate and defining at least one open cell which is filled with abradable material, the one or more wall structures being formed by additive-layer, powder-fed, laser-weld deposition onto the substrate, wherein the one or more wall structures are formed from nickel-based superalloy and constitute from about 10% to about 50% of the total volume of the sealing structure,
   wherein the one or more wall structures includes a single, continuous curvilinear wall arranged to define a plurality of open cells between first portions of the curvilinear wall that generally extend in a first direction and second portions of the curvilinear wall that generally extend in a second direction opposite the first direction, and
   wherein at least one cell of the plurality of open cells opens laterally such that the abradable material forms one or more lateral sides of the sealing structure.

2. The abradable sealing element according to claim 1, wherein the one or more wall structures formed from nickel-based superalloy constitute from 20% to 40% of the total volume of the sealing structure.

3. The abradable sealing element according to claim 1, wherein the abradable material constitutes from 50% to 90% of the total volume of the sealing structure.

4. The abradable sealing element according to claim 1, wherein each of the one or more wall structures has a multi-layered microstructure, observed in cross-section in a plane locally perpendicular to a profile of the substrate, comprising a plurality of stacked weld layers, each of the weld layers having a layer thickness, measured in a stacking direction, of no greater than 350 µm.

5. The abradable sealing element according to claim 4, wherein the layer thickness of each weld layer of the plurality of stacked weld layers is no less than 50 µm.

6. The abradable sealing element according to claim 1, wherein each of the one or more wall structures has a wall width of from 50 µm to 1200 µm.

7. The abradable sealing element according to claim 1, wherein at least one of the one or more wall structures has a tapered width profile in a direction extending away from the substrate.

8. The abradable sealing element according to claim 1, wherein at least one of the one or more wall structures is locally inclined at an oblique angle with respect to a profile of the substrate.

9. The abradable sealing element according to claim 1, wherein the nickel-based superalloy comprises:
   from 50 wt. % to 85 wt. % Ni,
   from 2 wt. % to 8 wt. % Al; and
   the usual impurities;
   wherein the nickel-based superalloy optionally further comprises:
      from 2 wt. % to 15 wt. % Co,
      from 3 wt. % to 10 wt. % Cr,
      from 1 wt. % to 7 wt. % W,
      up to 5 wt. % Re,
      4 wt. % to 8 wt. % Ta,
      up to 1 wt. % Si,
      up to 3 wt. % Hf,
      up to 3 wt. % Mo,
      up to 1 wt. % Fe,
      up to 1 wt. % Ti,
      up to 1 wt. % Cu,
      up to 0.04 wt. % C, and
      up to 0.03 wt. % B.

10. The abradable sealing element according to claim 1, wherein the abradable material comprises one or more of ceramic, metal, an intermetallic compound, yttria-stabilised zirconia (YSZ), alumina, a nickel-aluminium intermetallic compound, nickel aluminide (Ni$_3$Al), a nickel-aluminium (Ni—Al) alloy, or combinations thereof.

11. A method of manufacturing the abradable sealing element according to claim 1, the method comprising:
   depositing, by additive-layer, powder-fed, laser-weld deposition apparatus, nickel-based superalloy to form the one or more wall structures of the sealing structure on the substrate, the one or more wall structures defining the at least one open cell; and
   filling the at least one open cell with abradable material;
   wherein the method comprises controlling the amount of nickel-based superalloy deposited onto the substrate such that nickel-based superalloy constitutes from 10% to 50% of the total volume of the sealing structure.

12. The method according to claim 11, further comprising: controlling the amount of nickel-based superalloy deposited onto the substrate such that nickel-based superalloy constitutes from 20% to 40 of the total volume of the sealing structure.

13. The method according to claim 11, further comprising: controlling the amount of abradable material filling the at least one open cell such that abradable material constitutes from 50% to 90% of the total volume of the sealing structure.

14. The method according to claim 11, wherein depositing nickel-based superalloy to form each wall structure comprises:
   sequentially depositing, by additive-layer, powder-fed, laser-weld deposition apparatus, a plurality of nickel-based superalloy layers overlying one another on the substrate to form the wall structure;
   wherein each nickel-based superalloy layer has (a) a layer thickness, measured in a direction locally perpendicular to a profile of the substrate, of from 50 μm to 350 μm, and (b) a layer width, measured in a direction locally parallel to the profile of the substrate, of from 50 μm to 1200 μm.

15. The method according to claim 11, wherein the method comprises, during additive-layer, powder-fed, laser-weld deposition of the one or more wall structures:
   (i) controlling a powder spot size to be from 0.1 mm to 3 mm;
   (ii) controlling a laser spot size to be from 50 m to 1000 m;
   (iii) controlling a laser scanning speed to be from 400 mm/minute to 2000 mm/minute;
   (iv) controlling a powder feed rate to be from 0.25 g/minute to 10 g/minute; and
   (v) controlling a laser power to be between 20 and 500 Watts.

16. The method according to claim 11, wherein the method comprises:
   varying one or more deposition parameters of the additive-layer, powder-fed, laser-weld deposition apparatus during deposition of at least one of the one or more wall structures such that said wall structure has a tapered width profile in a direction extending away from the profile of the substrate, wherein the method comprises:
   depositing a plurality of nickel-based superalloy layers overlying one another on the substrate to form the wall structure; and varying one or more deposition parameters of the additive-layer, powder-fed, laser-weld deposition apparatus during deposition of the plurality of nickel-based superalloy layers such that two or more layers have different layer widths.

17. The method according to claim 11, wherein filling the at least one open cell with abradable material comprises:
   filling the at least one open cell with abradable material powder; and
   sintering the abradable material powder in the at least one open cell.

18. The method according to claim 11, wherein the nickel-based superalloy comprises:
   from 50 wt. % to 85 wt. % Ni,
   from 2 wt. % to 8 wt. % Al; and
   the usual impurities;
   wherein the nickel-based superalloy optionally further comprises:
   from 2 wt. % to 15 wt. % Co,
   from 3 wt. % to 10 wt. % Cr,
   from 1 wt. % to 7 wt. % W,
   up to 5 wt. % Re,
   4 wt. % to 8 wt. % Ta,
   up to 1 wt. % Si,
   up to bout 3 wt. % Hf,
   up to 3 wt. % Mo,
   up to 1 wt. % Fe,
   up to 1 wt. % Ti,
   up to 1 wt. % Cu,
   up to 0.04 wt. % C, and
   up to 0.03 wt. B.

19. The method according to claim 11, wherein the abradable material comprises one or more of ceramic, metal, an intermetallic compound, yttria-stabilised zirconia (YSZ), alumina, a nickel-aluminium intermetallic compound, nickel aluminide (Ni$_3$Al), a nickel-aluminium (Ni—Al) alloy, or combinations thereof.

20. A gas turbine engine comprising abradable sealing element comprising a substrate and a sealing structure, the sealing structure comprising one or more wall structures extending from the substrate and defining at least one open cell which is filled with abradable material, the one or more wall structures being formed by additive-layer, powder-fed, laser-weld deposition onto the substrate, wherein the one or more wall structures are formed from nickel-based superalloy and constitute from about 10% to about 50% of the total volume of the sealing structure,
   wherein the one or more wall structures includes a single, continuous curvilinear wall arranged to define a plurality of open cells between first portions of the curvilinear wall that generally extend in a first direction and second portions of the curvilinear wall that generally extend in a second direction opposite the first direction, and
   wherein at least one cell of the plurality of open cells opens laterally such that the abradable material forms one or more lateral sides of the sealing structure.

* * * * *